United States Patent
Huang et al.

(10) Patent No.: US 8,909,765 B2
(45) Date of Patent: Dec. 9, 2014

(54) ANALYZING WEBPAGE USERS' WEB ACCESS ACTIONS BY USING A DEFINED FOCAL REGION

(75) Inventors: Chang Huang, Shanghai (CN); Wei Huang, Shanghai (CN); Jia Ye Wang, Shanghai (CN); Wei Yang, Shanghai (CN); Xiang Zhou, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 279 days.

(21) Appl. No.: 13/249,518

(22) Filed: Sep. 30, 2011

(65) Prior Publication Data

US 2012/0110168 A1    May 3, 2012

(30) Foreign Application Priority Data

Oct. 29, 2010   (CN) .......................... 2010 1 0532178

(51) Int. Cl.
  *G06F 15/173*   (2006.01)
  *G06Q 10/00*   (2012.01)
  *H04L 29/08*   (2006.01)
  *G06F 17/30*   (2006.01)

(52) U.S. Cl.
  CPC .......... *G06F 17/30867* (2013.01); *G06Q 10/00* (2013.01); *H04L 67/02* (2013.01); *H04L 67/22* (2013.01)
  USPC ............................. 709/224; 709/217; 704/275

(58) Field of Classification Search
  CPC .. G06F 17/30867; G06Q 10/00; H04L 67/02; H04L 67/22
  USPC .................... 709/224, 217; 704/275
  See application file for complete search history.

(56) References Cited

U.S. PATENT DOCUMENTS

| | | | | |
|---|---|---|---|---|
| 6,334,131 | B2* | 12/2001 | Chakrabarti et al. | 1/1 |
| 6,701,350 | B1* | 3/2004 | Mitchell | 709/217 |
| 2004/0060008 | A1 | 3/2004 | Marshall | |
| 2007/0055774 | A1* | 3/2007 | Fukumoto et al. | 709/224 |
| 2008/0040473 | A1* | 2/2008 | Larsson et al. | 709/224 |
| 2008/0046562 | A1* | 2/2008 | Butler | 709/224 |
| 2008/0319761 | A1* | 12/2008 | Da Palma et al. | 704/275 |
| 2009/0228572 | A1* | 9/2009 | Wall et al. | 709/218 |
| 2009/0300709 | A1* | 12/2009 | Chen et al. | 726/1 |
| 2010/0082555 | A1* | 4/2010 | Ogawa et al. | 707/688 |
| 2010/0161400 | A1* | 6/2010 | Snodgrass et al. | 705/14.16 |
| 2010/0318976 | A1* | 12/2010 | Everly et al. | 717/141 |
| 2012/0016862 | A1* | 1/2012 | Rajan | 707/710 |

FOREIGN PATENT DOCUMENTS

| CN | 101506801 A | 8/2009 |
|---|---|---|
| CN | 101739402 A | 6/2010 |

OTHER PUBLICATIONS

"Tracking Complex Web Page Interactions Using dcsMultiTrack," WebTrends Analytics, http://www.webcitation.org/query?url=http%3A%2F%2Fwww.codesnippits.com%2Fpro%2Ffiletracker.aspx%3Fid%3D41892381&date=2010-07-08, Jul. 8, 2010.

* cited by examiner

*Primary Examiner* — Michael C Lai
(74) *Attorney, Agent, or Firm* — Winstead, P.C.

(57) ABSTRACT

A method, system and computer program product for web access analytics. Date related to the users' access to page elements is received. The page elements accessed by the users which are capable of being mapped to a defined webpage focal region are determined. The users' access to the webpage focal region is analyzed based on the determined page elements capable of being mapped to the webpage focal region.

18 Claims, 5 Drawing Sheets

ANALYZING WEBPAGE USERS' WEB ACCESS ACTIONS BY USING A DEFINED FOCAL REGION

CROSS-REFERENCE TO RELATED APPLICATIONS

This application claims priority under 35 U.S.C. §119(a) from Chinese Patent Application No. 201010532178.2, filed on Oct. 29, 2010, the contents of which are incorporated herein by reference.

TECHNICAL FIELD

The present invention relates to web analytics technology, and more particularly, to analyzing webpage users' web access actions by using a defined focal region.

BACKGROUND

With the expeditious development of web technology, various kinds of web sites or web applications have sprung up. In the web service field, web analytics needs to be performed so as to better understand and analyze information related to users' access to web sites and pages of the websites. Web analytics provides a series of analytical results through analyzing the actions of users' access to pages, which, by using the analytical results, may conveniently and intuitively understand the trend of users' access to web pages. Specifically, the analytical results may comprise clicking path information related to visitors' page access sequences inside a website, and with this information, a website technician may better organize and adjust the page structure and content arrangement inside the website.

In a traditional Web 1.0 environment, web analytics tools, such as Google® Analytics, and Web Trends®, usually perform data statistical analysis on the user's access data per page because, in the Web 1.0 environment, a user's clicking operation on a page will cause a jump of the page (i.e., a change of the URL address).

However, the above web analytics methods or tools applicable in the Web 1.0 environment are not applicable in the Web 2.0 environment because in the Web 2.0 environment, Asynchronous JavaScript® and XML (Ajax) technology, which is a web development technology creating an interactive web application, is widely used. As a result, many operations may be performed when a user visits a website in the Web 2.0 environment which do not require a jump of the page (i.e., no change to the URL address). Therefore, many operations in a Web 2.0 website are performed based on dynamic page elements and not based on pages. If the web analytics methods or tools in a traditional Web 1.0 environment are still used, it would be impossible to correctly collect, in the Web 2.0 website, data information related to users' access operations in the website. From another perspective, many different pages inside a website may actually have page elements with a similar structure or content. For example, in a portal website, there are dozens or even hundreds of subpages under the news column, which comprise news page elements with similar structures. If user access analytics is still performed based upon page jump in a traditional manner, it would be impossible to make statistics on users' visit traffic and visit habits on the news column. In other words, to perform web analytics in a Web 2.0 website, more hybrid data must be collected to mine meaningful information therein. It also provides a bigger challenge for data collection, data visualization, and information filtering during a web analytics process.

BRIEF SUMMARY

In one embodiment of the present invention, a method for web access analytics comprises receiving data related to users' access to page elements. The method further comprises determining page elements accessed by the users and capable of being mapped to a defined webpage focal region. In addition, the method comprises analyzing, by a processor, the users' access to the webpage focal region based on the determined page elements capable of being mapped to the webpage focal region.

Other forms of the embodiment of the method described above are in a computer program product and in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Hereinafter, a method, system and computer program product for collecting user access data based on page elements, instead of pages, and analyzing the collected user access data based on a defined webpage focal region will be described in detail through embodiments with reference to the drawings.

Figure 1:
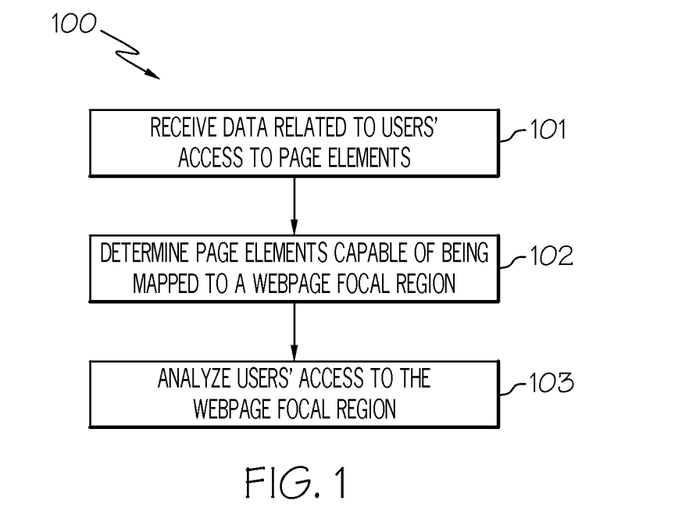
FIG. 1 is a flowchart of a method for analyzing webpage user access data in accordance with an embodiment of the present invention.

Referring now to the Figures in detail, FIG. 1 illustrates a flowchart of a method 100 for analyzing webpage user access data according to an embodiment of the present invention. Referring to FIG. 1, in step 101, data related to users' access to page elements is received. "Page element" refers to a basic unit composed of a page. On a page, a page element may be embodied as a button, a link or a division (div), etc. In HTML source code of a page, a page element may be embodied as a node of an HTML source code DOM Tree. A page element does not have an independent uniform resource locator URL address, and a page may comprise a plurality of page elements. When users access a website, especially a website adopting the JavaScript® technology under Web 2.0, they always click on some buttons or links inside a page, while in many cases, these clicks on the buttons or links will not trigger a page jump. In other words, the URL address does not change. Therefore, at step 101, the received data related to users' access are access data directed to page elements, not to pages. According to an embodiment of the present invention, receiving data related to users' access to page elements may be performed by tools, such as IBM® Web Click Analyzer or other user click stream tracking methods. However, the skilled in the art should understand, no matter what method is adopted to receive data related to users' access to page elements, it falls within the scope of the present invention. According to an embodiment of the present invention, the data related to users' access to page elements is click action triggered by users' clicking operations through a mouse. According to another embodiment of the present invention, the data related to users' access to page elements is access action triggered by users' touching operations through a touch screen. The skilled in the art should understand that users may trigger access to page elements in a plurality of manners. Meanwhile, it should be further noted that the technical solution and embodiments of the present invention are not only applicable in a Web 2.0 environment, but also applicable in any webpage environment where access to page elements will not cause a change of the page URL.

In step 102, page elements accessed by the users and capable of being mapped to a defined webpage focal region are determined.

Different from a traditional web analytics manner, "webpage focal region" refers to a basic unit for analyzing users' access to a website. According to an embodiment of the present invention, a webpage focal region comprises a visualized region inside a page. According to another embodiment of the present invention, a webpage focal region comprises a series of page elements inside a plurality of pages within a same website. In this case, a webpage focal region may be understood as an abstract set of page elements dispersed within a plurality of pages. In other words, a webpage focal region may be, but not necessarily, limited within a page. Hereinafter, how a webpage focal region is generated will be introduced. According to an embodiment of the present invention, a webpage focal region is predefined. According to another embodiment of the present invention, a webpage focal region is dynamically defined and updated when dynamically analyzing users' access to a website. According to an embodiment of the present invention, a webpage focal region is defined by a website technician or a website administrator. According to another embodiment of the present invention, a webpage focal region is automatically generated based on a predefined focal region generation rule and automatically updated during a dynamic analyzing process. The focal region generation rule may comprise, for example, a page element having some characteristics being automatically added into a webpage focal region.

Hereinafter, a specific manner of defining a webpage focal region will be introduced. The webpage focal region is co-determined by a set of pages and a set of page element characteristics.

According to an embodiment of the present invention, a set of pages refers to a set of accurate URL addresses, for example http://finance.sina.com.cn/roll/20100804/01553.shtml. According to another embodiment of the present invention, a set of pages refers to a set of URL expressions with a similar pattern, for example http://finance.sina.com.cn/rol/20100804/(.)*. According to a still further embodiment of the present invention, a set of pages is a set comprising the above accurate URL addresses and similar but inaccurate URL expressions.

According to an embodiment of the present invention, a set of page element characteristics comprises a page element ID and a page element name. A page element ID in the HTML source code is assigned by id="string" statement, and the ID of the page element may be obtained through for example document.getElementById/id("xxx"). A page element name in the HTML source code is assigned by name="string" statement, and the name of the page element may be obtained through, for example, document.getElementByName/name ("xxx"). Then, a set of defined page element IDs and name family may be expressed as ids->"id_xxx, id_yyy . . . ," name->"name_xxx, name_yyy . . . ."

According to another embodiment of the present invention, a set of page element characteristics comprises a page element family having particular attributes. The attributes of the page element may include, but not limited to, a link path for a link node such as "link path":<a href=" . . . />, a link content for a link node such as "link content":<a>content</a>, an action attribute for a form node such as "form target":<form action=" . . . />, etc. Then, a set of defined particular page element attribute family may be expressed as, for example, {images:[{src:'xxx'}, {src:'yyy'}], links:[{href:'aaa'}, {href'bbb'}], . . . }.

According to a still further embodiment of the present invention, the set of page element characteristics comprises a page element family having a particular page element path Xpath. The page element path Xpath is an expression obtained through a path expression traversing an HTML document of a page. A page element path expression includes, but not limited to, a page element Xpath location path expression, a page element Xpath ID/name path expression, and a page element Xpath generic attribute path expression. For example, the page element Xpath location path expression may be "//body/div[5]/table[1]/tr[3]/td[1]/div[3]" . . . , the page element Xpath ID/name path expression may be "//body/div[@name='xxx']/div[5]," and the page element Xpath generic attribute path expression may be "//body/div[@class='yyy']/input[@type=button]."

According to a still further embodiment of the present invention, a set of page element characteristics comprises any customized page element characteristic, for example, any characteristic which plays a role of distinguishing such as, inter alia, a length, width, height, and color of the page element.

A webpage focal region as above defined is not only restricted by a page URL pattern but also restricted by a page element characteristic, such as page element ID, name, attribute, etc. The skilled in the art should understand that the above provided expressions are for exemplary illustration and not intended for making any limitation to the specific expression. Of course, the skilled in the art should understand that the above webpage focal region being subjected to dual limitations by the page URL pattern and a set of page element characteristics is only an embodiment of the present invention, and it is completely feasible to only adopt one of them to define the webpage focal region, for example, only using a set of page element characteristics to filter received page elements accessed by users.

Determining page elements accessed by the users and capable of being mapped to a defined webpage focal area at step 102 refers to determining to which webpage focal region each page element among a plurality of page elements accessed by the users belongs, and correspondingly making statistics on the data related to users' access to those page elements as the data related to users' access to the webpage focal region to which those page elements belong. It should be noted that a page element may be included in only one webpage focal region or in a plurality of webpage focal regions. Thus, during the process of mapping a page element to a focal region, data related to users' access to the page element may be counted as data related to users' access to a plurality of webpage focal regions to which this page element belongs. Likewise, there also exists such case that one or more page elements accessed by users do not belong to any defined webpage focal region. Hereinafter, detailed embodiments of mapping a page element to a webpage focal region will be introduced further below with reference to FIG. 2.

Referring again to FIG. 1, because the data related to users' access to page elements has been received at step 101, and the page elements have been mapped to a defined webpage focal region at step 102, then at step 103, users' access to the webpage focal region will be analyzed based on the page elements mapped to the webpage focal region. According to an embodiment of the present invention, analyzing users' access to the webpage focal region comprises analyzing the times or residence time for the users' access to the webpage focal region during a certain time span. According to another embodiment of the present invention, analyzing users' access to the webpage focal region comprises analyzing users' access to different webpage focal regions in a space dimension. For example, a website comprises a plurality of defined webpage focal regions, and then comparative analysis on access traffics of the plurality of webpage focal regions and correlation analysis on the plurality of webpage focal regions are presented in an analysis report. For example, users usually first visit a focal region 1, and then jump to a focal region 3, and finally visit a focal region 2. According to a yet further embodiment of the present invention, analyzing users' access to the webpage focal region comprises analyzing users' access to a same webpage focal region in a time dimension, for example, analyzing users' access sequence and access traffics of different page elements within a webpage focal region. Of course, the skilled in the art should understand that a plurality of different analytics methods may be further created as required, and as long as data related to users' access to the webpage focal region is used as basic statistical information, any analytical objective or any specific analytical means or any analytical outcome falls within the scope of the present invention.

As described above, with the method as illustrated in FIG. 1, information related to user's access to a website may be collected based on page elements, and data analysis may be performed based on a flexible and customizable interested region of a single page or across pages. It overcomes the drawback of a traditional web analytics means which makes statistics on user access data per page and cannot adapt to a web analytics requirement in a Web 2.0 environment.

In some implementations, method 100 may include other and/or additional steps that, for clarity, are not depicted. Further, in some implementations, method 100 may be executed in a different order presented and that the order presented in the discussion of FIG. 1 is illustrative. Additionally, in some implementations, certain steps in method 100 may be executed in a substantially simultaneous manner or may be omitted.

Figure 2:
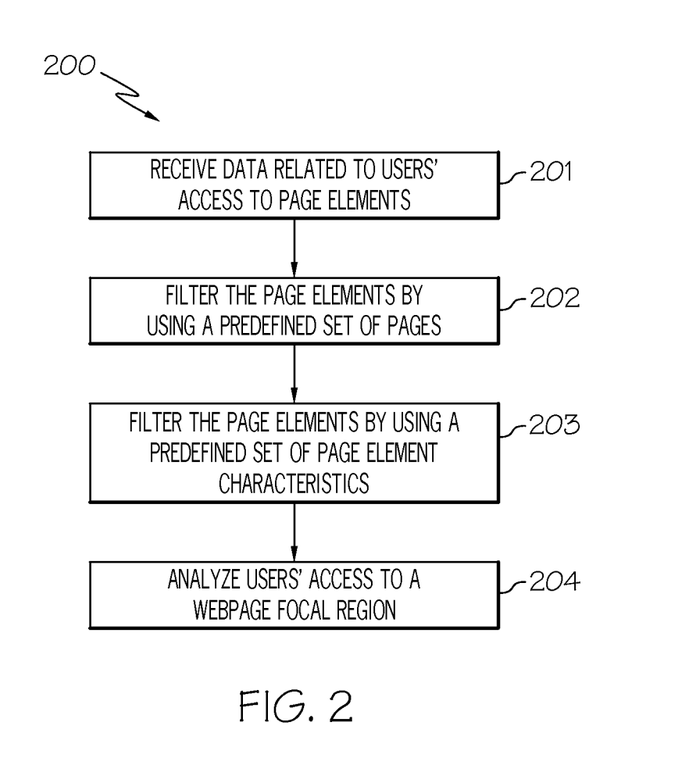
FIG. 2 is a flowchart of an alternative method for analyzing webpage user access data in accordance with an embodiment of the present invention.

FIG. 2 illustrates a flowchart of a method 200 for analyzing webpage user access data according to another embodiment of the present invention. Referring to FIG. 2, step 201 corresponds to step 101 of method 100 of FIG. 1, and step 204 corresponds to step 103 of method 100 of FIG. 1, which will not be detailed here.

In step 202, the page elements accessed by the users are filtered by using a URL pattern in a defined set of pages so as to determine page elements having a matched URL and accessed by the users.

Suppose the URL pattern in the predefined set of pages is http://dd.abc.com/20100804/(.)*, then if the URL to which a received page element accessed by the users is http://dd.abc.com/20090804/3.html, it is determined that the URL to which the page element belongs does not match the URL pattern in the predefined set of pages, thereby filtering out the URL which the page element belongs to from the URLs which all page elements belong to. It should be noted that the predefined URL pattern may also be a specific URL address, which is not necessarily expressed in a wildcard manner. It should be further noted that for a webpage focal region, its predefined set of pages may comprise one or more URL patterns; as long as the URL to which the page element belongs matches one or more of these predefined URL patterns, this page element should not be filtered out.

Next, at step 203, the page elements having the matched URL are filtered by using a defined set of page element characteristics, so as to determine page elements capable of being mapped to the webpage focal region. Page elements matching the predefined page element characteristics are determined with the page element characteristics as introduced above, and the page elements which do not match are filtered out. As indicated above, page element characteristics include, but not limited to: ID, name, generic attribute, path of page element, and special attribute of DOM node, etc. After performing step 203, because the page element access data received at step 201 has been filtered by using the defined set of pages and the defined set of page element characteristics and the webpage focal region is just co-defined or co-determined by the set of pages and the set of page element characteristics, the filtered page elements are just the page elements included in one webpage focal region, and their access data may be used for making statistics on the information related to users' access to the webpage focal region to which they belong.

The skilled in the art should understand the implementation sequences of steps 202 and 203 may be swapped. In other words, the received page elements accessed by the users may be first filtered with the page element characteristics in the defined set of page element characteristics, and then the page elements will be further filtered with the URL pattern in the defined set of pages.

In some implementations, method 200 may include other and/or additional steps that, for clarity, are not depicted. Further, in some implementations, method 200 may be executed in a different order presented and that the order presented in the discussion of FIG. 2 is illustrative. Additionally, in some implementations, certain steps in method 200 may be executed in a substantially simultaneous manner or may be omitted.

Figure 3:
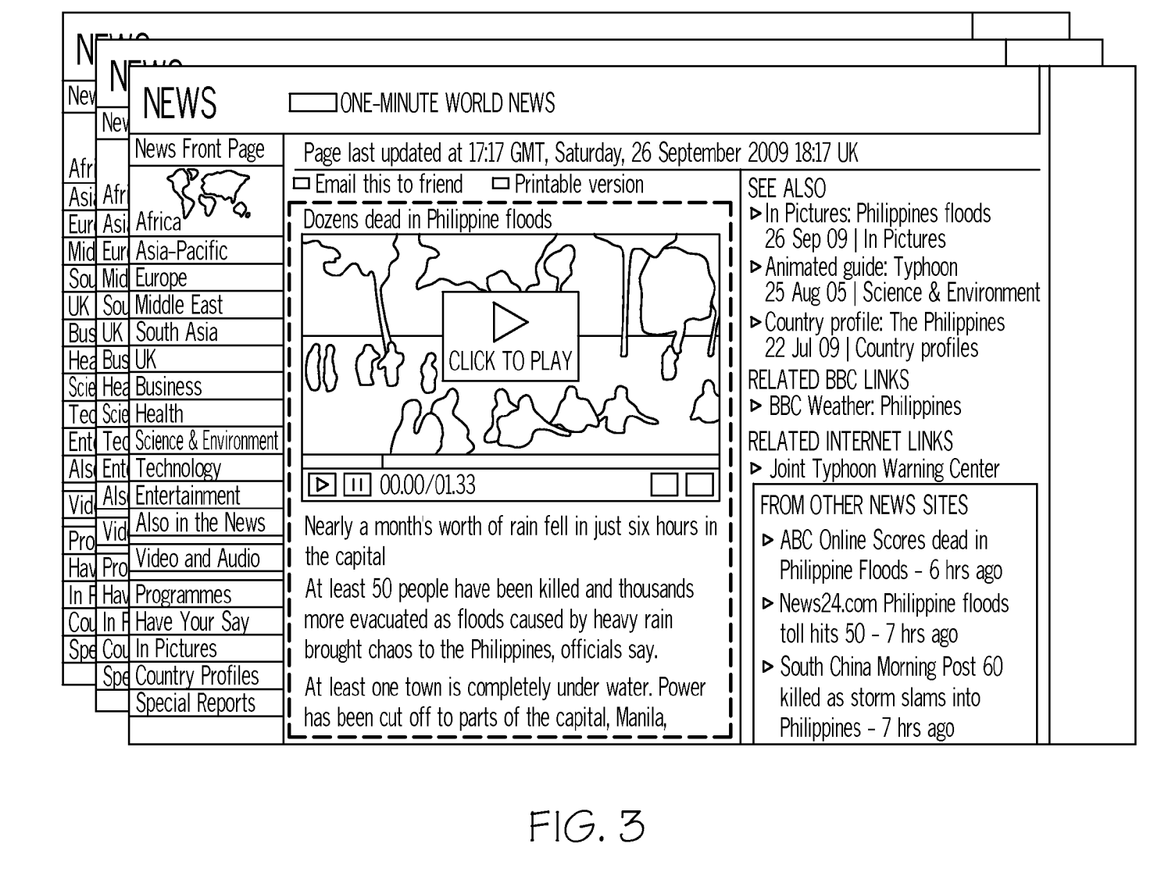
FIG. 3 illustrates a diagram of a webpage interested region defined inside a website according to an embodiment of the present invention.

FIG. 3 illustrates a diagram of a webpage interested region defined inside a website according to an embodiment of the present invention. As illustrated in FIG. 3, a plurality of pages within a website belongs to subpages under a news column, whose URL addresses are different from one another. However, their URLs have a common URL pattern, which is assumed to be http://news.aa.com/(.)*, and then this URL pattern may be used to construct a set of pages in a webpage focal region. Meanwhile, not all page elements in a page in conformity with the URL pattern are necessarily included in the webpage focal region; for example, each news page may include some advertisement links or pictures irrelevant to news, and then the data related to users' access to these irrelevant page elements may not be required to count, where only data related to users' access to news content are required to count. Thus, a set of page element characteristics, for example, <img src=" . . . /> and <a> news title: . . . </a> is further defined such that a page element in conformity with the above defined set of page element characteristics may be further determined from those pages in conformity with the URL pattern. In FIG. 3, the region in the wire-frame is a section belonging to a webpage focal region under each news page, and all corresponding sections in conformity with the URL pattern in the news subpage constitute a news webpage focal region. It may be seen that this news webpage focal region is constructed across pages, and a page jump (i.e., a change of the URL address) might not occur when clicking on a page element in a corresponding news webpage focal region section in each news subpage, but such page element clicking actions to which a page jump does not occur may also be differentiated, collected, counted, and analyzed.

Figure 4:
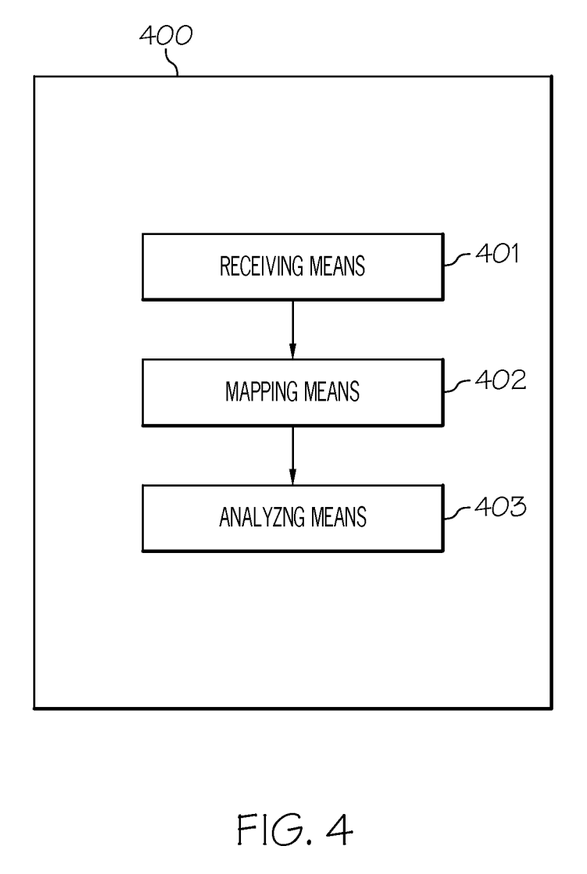
FIG. 4 illustrates a block diagram of a system for analyzing webpage user access data according to an embodiment of the present invention.

FIG. 4 illustrates a block diagram of a system for analyzing webpage user access data according to an embodiment of the present invention. The system as illustrated in FIG. 4 is generally indicated by a system 400. Specifically, the system 400 comprises: receiving means 401 for receiving data related to users' access to page elements; mapping means 402 for determining page elements accessed by the users and capable of being mapped to a defined webpage focal region; and analyzing means 403 for analyzing the users' access to the webpage focal region based on the determined page elements capable of being mapped to the webpage focal region. The means 401-403 in the system 400 correspond to steps 101-103 of method 100 of FIG. 1, respectively, which will not be detailed here.

Figure 5:
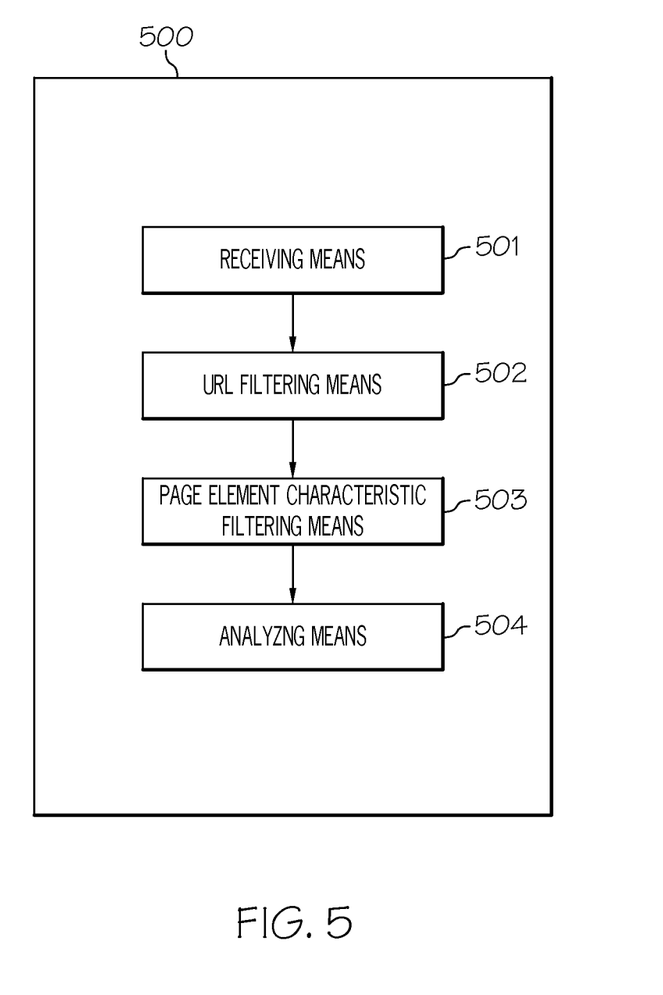
FIG. 5 illustrates a block diagram of an alternative system for analyzing webpage user access data according to an embodiment of the present invention.

FIG. 5 illustrates a block diagram of a system for analyzing webpage user access data according to another embodiment of the present invention. The system as illustrated in FIG. 5 is generally indicated by a system 500. Specifically, the system 500 comprises: receiving means 501 for receiving data related to users' access to page elements; URL filtering means 502 for filtering the page elements accessed by the users by using a URL pattern in a defined set of pages, so as to determine page elements accessed by the users and having a matched URL; page element characteristic filtering means 503 for filtering the page elements having the matched URL by using a defined set of page element characteristics, so as to determine page elements capable of being mapped to a webpage focal region; and analyzing means 504, for analyzing the users' access to the webpage focal region based on the determined page elements capable of being mapped to the webpage focal region. The means 501-504 in the system 500 correspond to steps 201-204 in method 200 of FIG. 2, respectively, which will not be detailed here.

Figure 6:
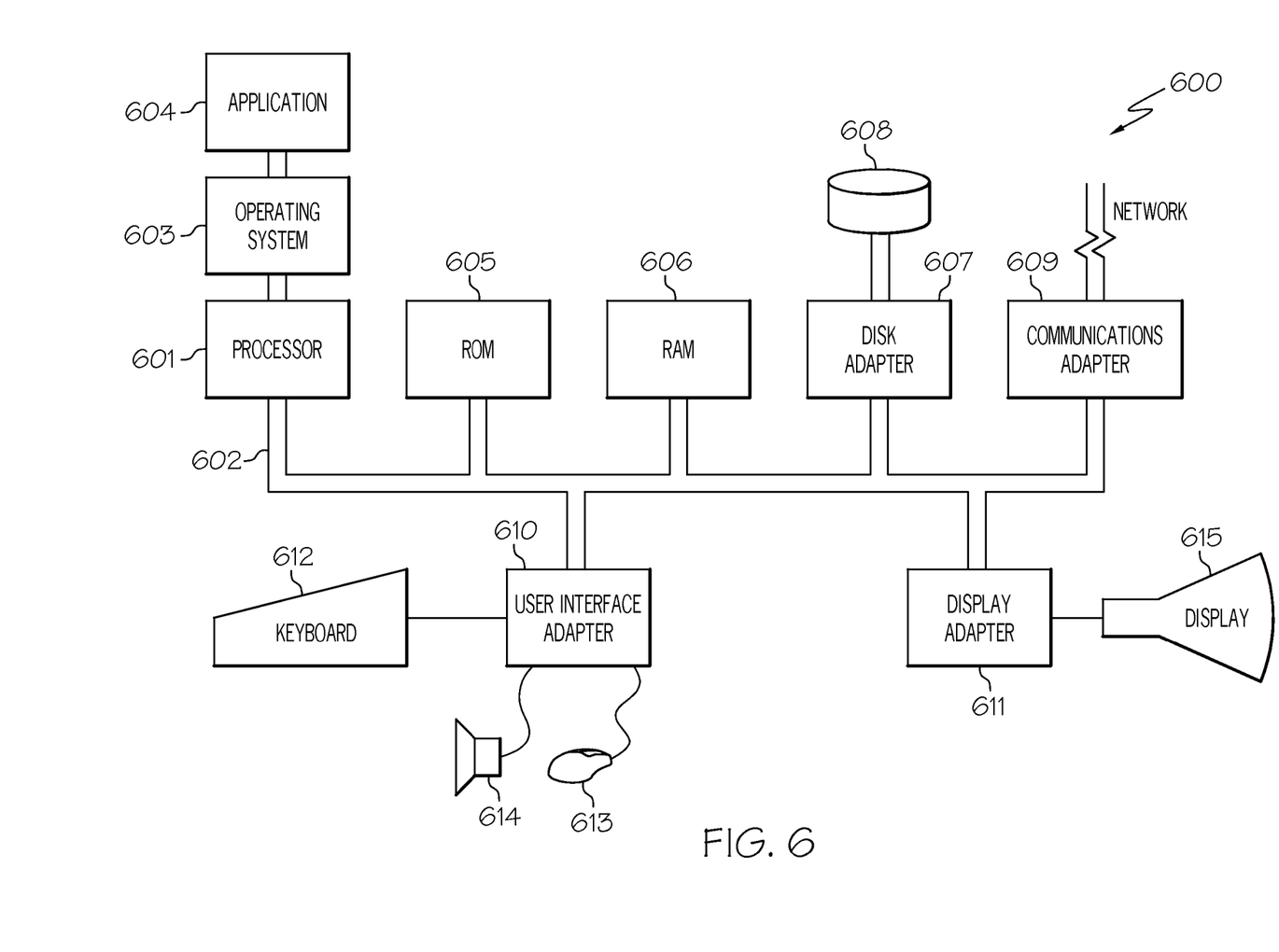
FIG. 6 depicts an embodiment of a hardware configuration of a computer system which is representative of a hardware environment for practicing the present invention.

FIG. 6 depicts an embodiment of a hardware configuration of a computer system 600 which is representative of a hardware environment for practicing the present invention. Referring to FIG. 6, computer system 600 has a processor 601 coupled to various other components by system bus 602. An operating system 603 may run on processor 601 and provide control and coordinate the functions of the various components of FIG. 6. An application 604 in accordance with the principles of the present invention may run in conjunction with operating system 603 and provide calls to operating system 603 where the calls implement the various functions or services to be performed by application 604. Application 604 may include, for example, an application for web access analytics as discussed above.

Referring again to FIG. 6, read-only memory ("ROM") 605 may be coupled to system bus 602 and include a basic input/output system ("BIOS") that controls certain basic functions of computer device 600. Random access memory ("RAM") 606 and disk adapter 607 may also be coupled to system bus 602. It should be noted that software components including operating system 603 and application 604 may be loaded into RAM 606, which may be computer system's 600 main memory for execution. Disk adapter 607 may be an integrated drive electronics ("IDE") adapter that communicates with a disk unit 608, e.g., disk drive.

Computer system 600 may further include a communications adapter 609 coupled to bus 602. Communications adapter 609 may interconnect bus 602 with an outside network (not shown) thereby allowing computer system 600 to communicate with other similar devices.

I/O devices may also be connected to computer system 600 via a user interface adapter 610 and a display adapter 611. Keyboard 612, mouse 613 and speaker 614 may all be interconnected to bus 602 through user interface adapter 610. Data may be inputted to computer system 600 through any of these devices. A display monitor 615 may be connected to system bus 602 by display adapter 611. In this manner, a user is capable of inputting to computer system 600 through keyboard 612 or mouse 613 and receiving output from computer system 600 via display 615 or speaker 614.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for web access analytics, the method comprising:
    receiving data related to users' access to page elements;
    determining which page elements accessed by the users are mapped to a defined webpage focal region, wherein the defined webpage focal region is a virtualized region of one or more webpages used for analyzing users' access to a website; and
    analyzing, by a processor, the users' access to the defined webpage focal region based on the determined page elements that are mapped to the defined webpage focal region;
    wherein the mapping page elements accessed by the users to the defined webpage focal region comprises:
        filtering the page elements accessed by the users by using a URL pattern in a defined set of pages to determine page elements having a matched URL and accessed by the users; and
        filtering the page elements having the matched URL by using a defined set of page element characteristics to determine page elements that are mapped to the defined webpage focal region.

2. The method as recited in claim 1, wherein the defined webpage focal region comprises a plurality of page elements located in different webpages.

3. The method as recited in claim 1, wherein the defined webpage focal region is co-determined by a set of webpages and a set of page element characteristics.

4. The method as recited in claim 1, wherein the defined set of page element characteristics comprise any combination of one or more of the following page element characteristics: page element ID, page element name, page element attribute, page element path, and customized page element characteristic.

5. The method as recited in claim 1, wherein the analyzing the users' access to the defined webpage focal region comprises at least one of:
    analyzing the users' access to different defined webpage focal regions in a time dimension;
    analyzing the users' access to different defined webpage focal regions in a space dimension; and
    analyzing a correlation and a difference between the users' access to different defined webpage focal regions.

6. The method as recited in claim 1, wherein the one or more webpages are a web 2.0 page.

7. A computer program product for web access analytics, the computer program product comprising a computer readable storage medium having program code embodied therewith, the program code comprising programming instructions for:
    receiving data related to users' access to page elements;
    determining which page elements accessed by the users are mapped to a defined webpage focal region, wherein the defined webpage focal region is a virtualized region of one or more webpages used for analyzing users' access to a website; and
    analyzing the users' access to the defined webpage focal region based on the determined page elements that are mapped to the defined webpage focal region;
    wherein the programming instructions for mapping page elements accessed by the users to the defined webpage focal region comprises the programming instructions for:

filtering the page elements accessed by the users by using a URL pattern in a defined set of pages to determine page elements having a matched URL and accessed by the users; and filtering the page elements having the matched URL by using a defined set of page element characteristics to determine page elements that are mapped to the defined webpage focal region.

8. The computer program product as recited in claim 7, wherein the defined webpage focal region comprises a plurality of page elements located in different webpages.

9. The computer program product as recited in claim 7, wherein the defined webpage focal region is co-determined by a set of webpages and a set of page element characteristics.

10. The computer program product as recited in claim 7, wherein the defined set of page element characteristics comprise any combination of one or more of the following page element characteristics: page element ID, page element name, page element attribute, page element path, and customized page element characteristic.

11. The computer program product as recited in claim 7, wherein the programming instructions for analyzing the users' access to the defined webpage focal region comprises at least one of the following programming instructions for:

analyzing the users' access to different defined webpage focal regions in a time dimension;

analyzing the users' access to different defined webpage focal regions in a space dimension; and analyzing a correlation and a difference between the users' access to different defined webpage focal regions.

12. The computer program product as recited in claim 7, wherein the one or more webpages are a web 2.0 page.

13. A system, comprising:

a memory unit for storing a computer program for web access analytics; and a processor coupled to the memory unit, wherein the processor is configured to execute the program instructions of the computer program comprising:

receiving data related to users' access to page elements;

determining which page elements accessed by the users are mapped to a defined webpage focal region, wherein the defined webpage focal region is a virtualized region of one or more webpages used for analyzing users' access to a website; and analyzing the users' access to the defined webpage focal region based on the determined page elements that are mapped to the defined webpage focal region;

wherein the program instructions for mapping page elements accessed by the users to the defined webpage focal region comprises the following program instructions:

filtering the page elements accessed by the users by using a URL pattern in a defined set of pages to determine page elements having a matched URL and accessed by the users; and filtering the page elements having the matched URL by using a defined set of page element characteristics to determine page elements that are mapped to the defined webpage focal region.

14. The system as recited in claim 13, wherein the defined webpage focal region comprises a plurality of page elements located in different webpages.

15. The system as recited in claim 13, wherein the defined webpage focal region is co-determined by a set of webpages and a set of page element characteristics.

16. The system as recited in claim 13, wherein the defined set of page element characteristics comprise any combination of one or more of the following page element characteristics: page element ID, page element name, page element attribute, page element path, and customized page element characteristic.

17. The system as recited in claim 13, wherein the program instructions for analyzing the users' access to the defined webpage focal region comprises at least one of:

analyzing the users' access to different defined webpage focal regions in a time dimension;

analyzing the users' access to different defined webpage focal regions in a space dimension; and analyzing a correlation and a difference between the users' access to different defined webpage focal regions.

18. The system as recited in claim 13, wherein the one or more webpages are a web 2.0 page.

\* \* \* \* \*